(12) United States Patent
Montgomery

(10) Patent No.: US 9,415,542 B2
(45) Date of Patent: Aug. 16, 2016

(54) ASSEMBLY AND METHOD OF COUPLING PIPES

(71) Applicant: ISCO Industries, Inc., Louisville, KY (US)

(72) Inventor: Michael John Montgomery, Hazel Green, AL (US)

(73) Assignee: ISCO Industries, Inc., Louisville, KY (US)

( * ) Notice: Subject to any disclaimer, the term of this patent is extended or adjusted under 35 U.S.C. 154(b) by 207 days.

(21) Appl. No.: 14/132,700

(22) Filed: Dec. 18, 2013

(65) Prior Publication Data

US 2015/0165672 A1 Jun. 18, 2015

(51) Int. Cl.
| | | |
|---|---|---|
| *B29C 65/34* | (2006.01) | |
| *B29C 65/58* | (2006.01) | |
| *B29C 65/78* | (2006.01) | |
| *B23P 19/04* | (2006.01) | |
| *B29C 65/00* | (2006.01) | |
| *B29C 65/02* | (2006.01) | |
| *B23K 37/053* | (2006.01) | |
| *B29C 65/56* | (2006.01) | |

(Continued)

(52) U.S. Cl.
CPC ............. *B29C 65/7802* (2013.01); *B23K 31/02* (2013.01); *B23K 37/0533* (2013.01); *B23P 19/04* (2013.01); *B29C 65/02* (2013.01); *B29C 65/342* (2013.01); *B29C 65/3424* (2013.01); *B29C 65/3468* (2013.01); *B29C 65/565* (2013.01); *B29C 65/58* (2013.01); *B29C 65/7841* (2013.01); *B29C 66/1122* (2013.01); *B29C 66/1222* (2013.01); *B29C 66/1224* (2013.01); *B29C 66/5221* (2013.01); *B29C 66/5229* (2013.01); *F16L 1/09* (2013.01); *F16L 1/10* (2013.01); *F16L 47/03* (2013.01); *B29C 66/1142* (2013.01); *Y10T 29/49902* (2015.01); *Y10T 29/5367* (2015.01)

(58) Field of Classification Search
CPC .. B29C 65/342; B29C 65/3424; B29C 65/58; B29C 66/1122; B29C 66/1142; B29C 66/5221; B29C 66/5229; B29C 65/7802; B21D 3/14; B23K 37/0533; B23P 19/02; B23P 19/04; B25B 5/147; B25B 27/02; B25B 27/10

See application file for complete search history.

(56) References Cited

U.S. PATENT DOCUMENTS 2,632,417 A * 3/1953 Smith ................ B23K 37/0533
   24/19
2,958,125 A * 11/1960 Nichols ..................... F16L 1/09
   254/29 R (Continued)

FOREIGN PATENT DOCUMENTS

DE    102011012198    9/2011
JP    11267888        10/1999

OTHER PUBLICATIONS

Large Diameter HDPE ElectroFusion Couplers IPF—Plasson. www.youtube.com/watch?v=-0mBVA_VTz4. Aug. 15, 2013.*

(Continued)

*Primary Examiner* — Michael Tolin
(74) *Attorney, Agent, or Firm* — Middleton Reutlinger

(57) ABSTRACT

A jig assembly and method of use are provided for positioning and re-rounding pipes for welding. The jig assembly comprises a first jaw assembly and a second jaw assembly which position and move a coupling onto one pipe then the second pipe for subsequent welding.

15 Claims, 14 Drawing Sheets

(51) Int. Cl.
*F16L 47/03* (2006.01)
*F16L 1/09* (2006.01)
*F16L 1/10* (2006.01)
*B23K 31/02* (2006.01)

(56) References Cited

U.S. PATENT DOCUMENTS

| | | | |
|---|---|---|---|
| 3,467,295 | A | 9/1969 | Watson |
| 3,729,360 | A | 4/1973 | McElroy |
| 3,846,208 | A | 11/1974 | McElroy |
| 3,882,299 | A | 5/1975 | Sciaky |
| 3,952,936 | A | 4/1976 | Dearman |
| 4,008,118 | A | 2/1977 | Wesebaum et al. |
| 4,315,702 | A | 2/1982 | Moe et al. |
| 4,457,647 | A | 7/1984 | Dusette et al. |
| 4,523,779 | A * | 6/1985 | Knox ............ F16L 13/10 285/21.1 |
| 4,779,902 | A * | 10/1988 | Lee ............ F16L 47/00 285/260 |
| 5,464,496 | A | 11/1995 | Wilson et al. |
| 5,527,406 | A | 6/1996 | Brath |
| 5,770,006 | A | 6/1998 | Andrew et al. |
| 5,830,312 | A | 11/1998 | Weimer et al. |
| 5,843,271 | A | 12/1998 | Andrew et al. |
| 6,325,277 | B1 | 12/2001 | Collie |
| 6,406,063 | B1 * | 6/2002 | Pfeiffer ............ B29C 65/342 285/21.2 |
| 6,550,514 | B1 | 4/2003 | Andrew |
| 7,191,686 | B1 | 3/2007 | Angelle et al. |
| 7,371,305 | B2 | 5/2008 | Sano et al. |
| 7,926,534 | B2 | 4/2011 | Temple |
| 8,128,853 | B2 | 3/2012 | St. Onge et al. |
| 2002/0101017 | A1 * | 8/2002 | Kolarik ............ B25B 27/10 269/43 |
| 2007/0256288 | A1 | 11/2007 | Vermaat |
| 2010/0090453 | A1 | 4/2010 | Bortoli |
| 2012/0043752 | A1 * | 2/2012 | McPherson ............ B29C 65/542 285/21.1 |
| 2013/0008881 | A1 | 1/2013 | Berbakov |

OTHER PUBLICATIONS

Electrofusion Installation Procedure Manual. Central Plastics Company. www.centralplastics.com/content/dam/gfps_country_US/Content/gfcp_assets/downloads/products/technical/EF%20Installation%20Booklet.pdf. May 2003.*

A guide on how to install a 800mm Friatec Electrofusion Coupling. www.youtube.com/watch?v=IZWME7XZ7BY. Jul. 25, 2013.*

Self-aligning hydraulic butt fusion machine, suitable for welding underpipe fusion machine pressure pipes for water, gas and other fluids; http://www.rjmcompany.com/pipe-fusion-machines/HDPE-fusion-machine.htm Sep. 10, 2013.

Hyram; Used for Re-Rounding Large Diameter PE pipe prior to use with electrofusion couplers; http://www.hyram.com/toolprint.php?id=9 Sep. 10, 2013.

Integrity; HDPE Pipe, especially in larger sizes, has a tendency to oval, usually as result of excessive heat from the sun coupled with loading pressures; http://www.integrityfusion.com/rerounding-clamps Sep. 10, 2013.

English Abstract of DE 102011012198; Mauz; Riexinger GmbH & Co. Sep. 1, 2011.

SnapTite, East of Installation, Jan. 9, 2014; SnapTite Design Guide, pp. 36-38, www.culvert-rehab.com.

Korean Intellectual Property Office, Written Opinion of the International Searching Authority, Apr. 15, 2015, pp. 1-11, International Application Division, Korean Intellectual Property Office, Metropolitan City, Republic of Korea.

ISCO Industries, Snap-Tite Culvert Lining System, catalog, Dec. 2013, pp. 1-6, ISCO Industries, Louisville, Kentucky.

* cited by examiner

ASSEMBLY AND METHOD OF COUPLING PIPES

STATEMENT REGARDING FEDERALLY SPONSORED RESEARCH

None.

REFERENCE TO SEQUENTIAL LISTING, ETC.

None.

CLAIM TO PRIORITY

None.

BACKGROUND

1. Field of the Invention

Present embodiments relate to jig assemblies for coupling of piping. More specifically, the present embodiments relate, but are not limited to, jig assemblies for coupling of thermal plastic piping and methods of positioning a coupling using the jig assemblies.

2. Description of the Related Art

Thermal plastic piping is utilized in a wide array of manufacturing and utility fields. In joining segments of piping, for example in new construction or repair of existing pipes, jig assemblies are utilized to hold piping segments together in order for a welding process or step to occur. Thermal plastic piping may include, but is not limited to, high density polyethylene (HDPE), low density polyethylene (LDPE), acrylonitrile butadiene styrene (ABS), polypropylene (PP), polyethylene (PE), and polyvinylidene fluoride (PVDF), for example.

One problem with the state of the art jig assemblies is related to size of the equipment. Many jigs are utilized which are enormous in size due to the size of the piping involved, for example in water or sewage service lines. When a break occurs in a service line, the area of substrate covering at the break is dug up and the jig assembly must be brought in to retain the pipes in position for a welding process. However, the size of the jig equipment requires that the hole be much larger in size than merely the area immediately surrounding the break. The jig equipment cannot typically fit into a hole and therefore, the cover substrate must be removed so that portions of the broken pipe may be brought to the surface and fitted into the jig assembly.

Another problem with attempts to either join or repair thermal plastic piping is that following initial manufacture and/or use over a period of time, large diameter pipes begin to sag and change shape from round to oblong. This is due to the inability of the material to support the weight of large sized piping. Additionally, soil loads on buried piping may cause this to occur. When coupling sections of pipe together, the oblong shape of the pipe makes welding sections together difficult, for example when welding a new piece of piping to an older piece or when welding pieces that have been stored for some period of time. The oblong shape must be corrected in order to render a pipe a round shape which may be aligned with and welded to another section of piping.

Additionally, one type of pertinent welding involves fusion welding where a small coupling joint material is placed at a joint between two pieces of piping. In large diameter piping, known methods of inserting the coupling on to a first pipe involves a hammer and piece of wood being used to beat the coupling over the end of at least one of the pieces of pipe. This difficulty is in addition to the difficulty associated with oblong shaping of piping and another reason that the piping sections must be positioned into a round shape to allow use with a coupling section. Further, this method provides opportunity for an injury in the field and/or damage to the coupling being forced on to the piping.

Accordingly, it would be desirable to overcome these and other known deficiencies to provide a jig assembly which may be positioned within a hole in the earth for new construction or repair and improves the method of positioning pipe assemblies during welding, for example.

SUMMARY

A jig assembly is provided and a method of use thereof which allows for joining of sections of pipe. The jig assembly includes a first jaw assembly and a second jaw assembly which are both hydraulically openable and closable to grasp, release and re-round the piping. Additionally, the jaw assemblies are joined by actuators to move the jaw assemblies closer or farther from one another allowing movement of the pipes, coupling or both.

According to some embodiments, a method of coupling pipes for a fusion weld comprises connecting a first re-rounder to a first pipe, connecting at least one linear actuator to the first re-rounder, the linear actuator being movable in a first direction which is transverse to the first re-rounder, connecting a second end of the at least one linear actuator to a backstop, the backstop being movable with the at least one linear actuator, a first moving of a coupling on to the first pipe with the backstop and the at least one linear actuator, connecting a second re-rounder to a second pipe, reversing orientation of the at least one linear actuator to connect to the second re-rounder, a second moving of the coupling into engagement with the second pipe to join said first and second pipes, and, fusion welding the coupling to the first and second pipes.

Optionally, the first moving may be a pull or a push. The second moving may be a moving of the first pipe and the coupling. The second moving may be moving of the first pipe. The second moving may be moving of the coupling. The method may further comprise connecting of electrodes to the coupling for the fusion welding.

According to some embodiments, a method of joining piping comprises connecting a first jaw assembly to a first pipe segment, connecting a second jaw assembly to a second pipe segment, clamping the first and second jaw assemblies to round the first and second pipe segments, respectively, connecting the first and second jaw assemblies with at least one linear actuator, actuating the linear actuator to move the first and second pipe segments closer together, and, connecting the segments by abutting the pipe segments.

Optionally, the pipe segments being joined with a coupling. One of the first and second jaw assemblies may move the coupling by actuation of the at least one linear actuator. The coupling may be positioned over adjacent ends of the first and second pipe segments. The coupling may be fusion welded. Alternatively, the method may comprise engaging pipe segment engagement structures of the first and second pipe segments to connect the piping segments. The actuating may include movement of the at least one linear actuator a first move. The method may further comprise changing orientation of the at least one linear actuator. The method may further comprising moving the at least one linear actuator in a second direction.

According to still a further embodiment, a method of joining piping with a jig assembly, comprises applying a first jaw assembly to a first pipe segment, applying a second jaw assembly to a second pipe segment, connecting a first end of a linear actuator to one of the first jaw assembly and the second jaw assembly, connecting a second end of the linear actuator to the other of the first jaw assembly and the second jaw assembly, actuating the linear actuator to move one of the pipe segments and a coupling, reversing the orientation of the linear actuator, and, positioning the coupling over adjacent ends of the first and second pipe segments. The positioning may include movement of the coupling. Alternatively, the positioning may include moving one of the pipe segments into the coupling. As a further alternative, the positioning may include movement of at least one of the first and second pipe segments.

According to some embodiments, a jig assembly for connecting pipes by a fusion weld comprises a first re-rounder having a jaw actuator to open and close the first re-rounder, a second re-rounder spaced from the first re-rounder, the second re-rounder having a second jaw actuator to open and close the second re-rounder, a first linear actuator extending between the first re-rounder and the second re-rounder to vary spacing between the first re-rounder and the second re-rounder, at least one pump for actuating the first and second jaw actuators and the linear actuator, and, a backstop connectable to the first linear actuator.

Optionally, the first re-rounder and the second re-rounder may each have a first jaw and a second jaw. The first jaw and said second jaw being pivotally connected at a hinge. The jaw actuators may be disposed opposite the hinges. The jaw actuators move in a tangential direction of the re-rounders. The re-rounders may have eyelets disposed on a circumference of the first jaw actuator. The eyelets may be in a plane extending in an axial direction of the re-rounders. The jig may further comprising a second jaw actuator. The second jaw actuator may be disposed opposite the first actuator. The first and second re-rounders only being connected by the first linear actuator. The at least one pump may be one of a hand pump or an automated pump.

According to another embodiment, a jig assembly for joining pipes may comprise a first jaw assembly having pivotally connected arms, a second jaw assembly having pivotally connected arms, each jaw assembly having a jaw actuator near adjacent ends of the arms to pivotally open and close the first and second jaw assemblies, a first linear actuator connected to the first and second jaw assemblies and a second linear actuator connected to the first and second jaw assemblies, the first and second linear actuators movable to position the jaw assemblies closer to one another.

Optionally, the first and second jaw assemblies may have an eyelet for connection of the linear actuator. The first and second jaw assemblies may have opposed linkages for connection of the jaw actuators. The linear actuators may be in flow communication with a hydraulic pump. The jaw actuators may be in flow communication with a hydraulic pump. The hydraulic circuit may include an automated pump or a manual pump. The actuators may be fluid powered and/or may be manually operable.

According to a further embodiment, a jig assembly comprises a first jaw assembly which is generally circular in shape and pivotally openable and closeable, a second jaw assembly which is generally circular in shape and pivotally openable and closeable, each of the first and second jaw assemblies including a first pair of segments pivotally connected to a second pair of segments, the first and second jaw assemblies each having a jaw actuator to cause opening and closing thereof, a linear actuator connected to the first jaw assembly at a first end and to the second jaw assembly at a second end, the linear actuator capable of moving the first and second jaw assemblies closer or farther from one another. The jig assembly may further comprise at least one fluid pump which may be a hand pump or automated.

All of the above outlined features are to be understood as exemplary only and many more features and objectives of the jig assemblies and method of use may be gleaned from the disclosure herein. Therefore, no limiting interpretation of this summary is to be understood without further reading of the entire specification, claims, and drawings included herewith.

BRIEF DESCRIPTION OF THE DRAWINGS

In order that the embodiments may be better understood, embodiments of the jig assembly and methods will now be described by way of examples. These embodiments are not to limit the scope of the claims as other embodiments of the jig assembly and methods will become apparent to one having ordinary skill in the art upon reading the instant description. Non-limiting examples of the present embodiments are shown in figures wherein:

DETAILED DESCRIPTION

Figure 1:
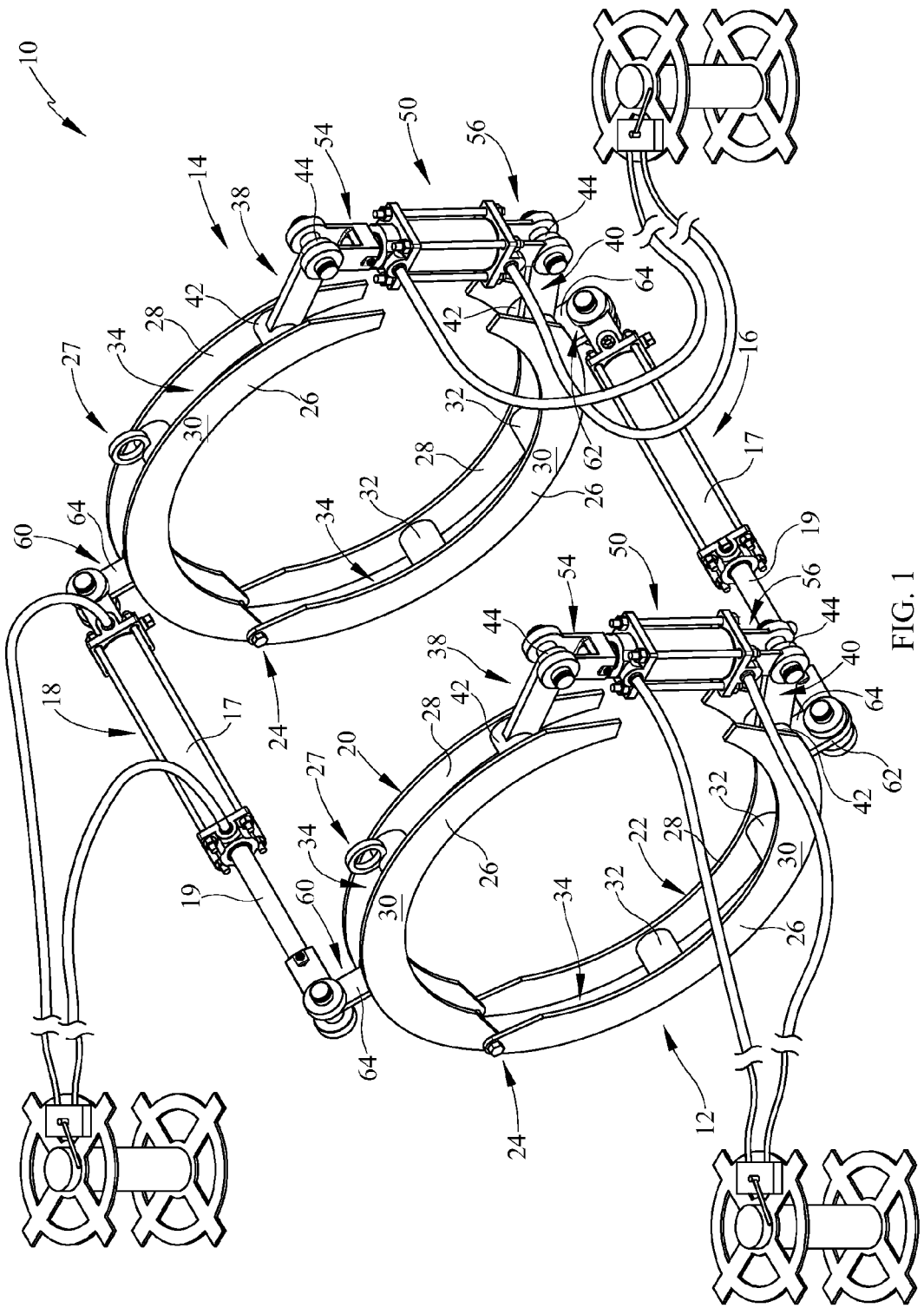
FIG. 1 is a perspective view of an exemplary embodiment of a jig assembly.

It should be understood that the assembly and method of coupling pipes is not limited in its application to the details of construction and the arrangement of components set forth in the following description or illustrated in the drawings. The embodiments are capable of other features and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Referring now in detail to the figures, wherein like numerals indicate like elements throughout several views, there are shown in FIGS. 1 through 14 various embodiments of a jig assembly and method of coupling pipes. The jig assembly includes first and second jaw assemblies which are, according to one embodiment, not frame mounted and therefore, allow for easier positioning within a hole where a break in piping has occurred. The jig assembly allows for grasping of a first pipe and a second pipe for re-rounding. The jaw assembly also allows for positioning of the first and second pipes and positioning of a coupling segment on either or both of the first and second pipes for subsequent welding.

Referring now to FIG. 1, an isometric view of a jig assembly 10 is depicted. The jig assembly 10 includes a first jaw assembly 12, a second jaw assembly 14 and at least one linear actuator 16, 18 to move the first and second jaw assemblies 12, 14 closer or further from one another. According to the instant embodiment, the jig assembly 10 includes a first linear actuator 16 and a second linear actuator 18 spaced apart about 180° from one another. Although two actuators are shown, embodiments are considered which may include a single actuator or more than two actuators.

Figure 2:
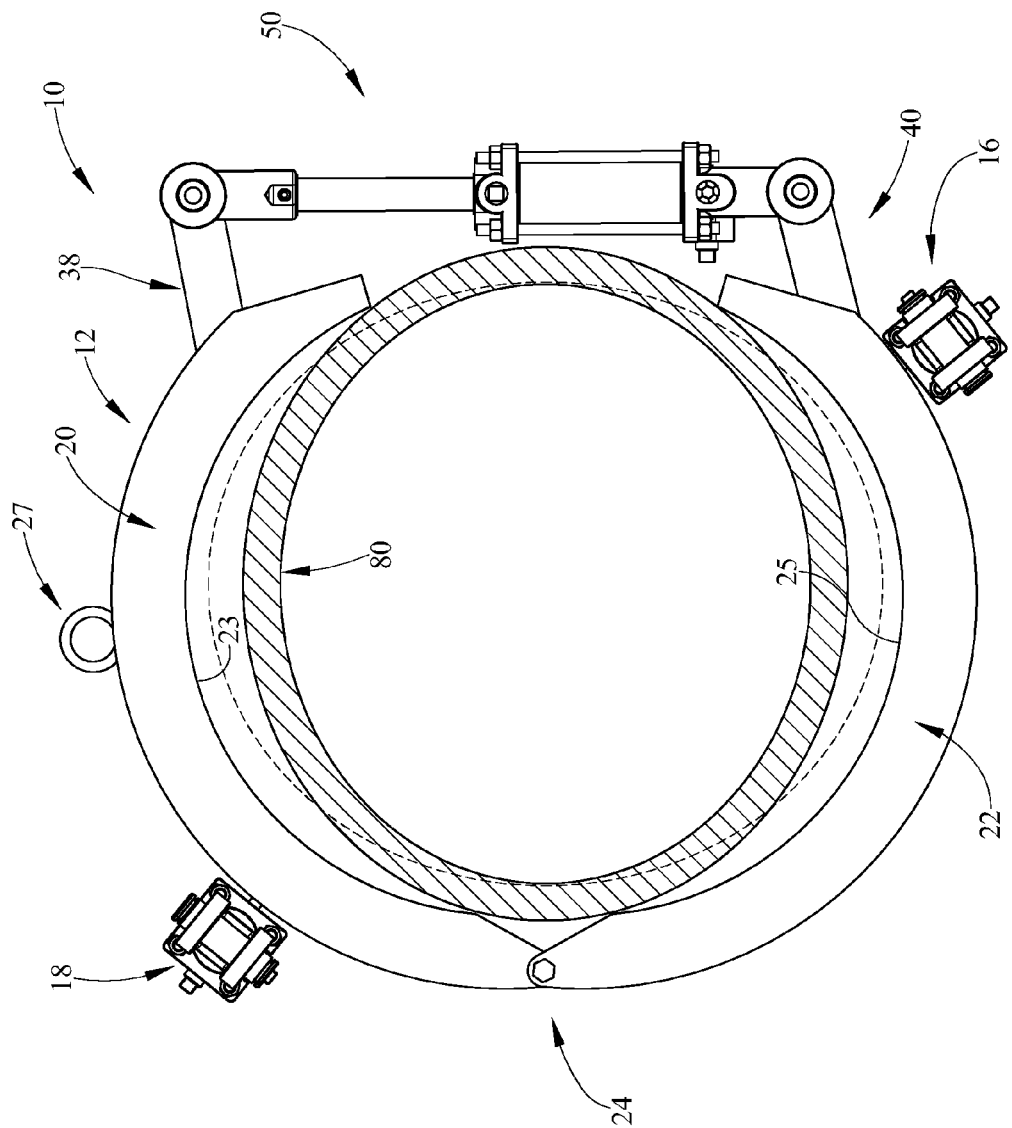
FIG. 2 is an end view of a jaw assembly in an open position with a pipe section therein in an oblong orientation.

The first jaw assembly 12 is openable and closable to engage or disengage a pipe 80 (FIG. 2). The first jaw assembly 12 is formed of a first arm 20 and a second arm 22. The first and second arms 20, 22 are generally semi-circular in shape and are connected by a pivot 24. The arms 20, 22 are semi-circular and formed of a first segment 26 and a parallel second segment 28. The arms 20, 22 may have a constant curvature corresponding to a specific diameter piping or may have a curvature which varies allowing usage of the jaw assemblies 12, 14 with various diameter pipe size. As a further alternative, a master jig size may be formed and inserts may be used to allow usage of the jaw assemblies 12, 14 with various pipe sizes. Each of the segments 26, 28 has an outwardly facing surface 30 which is substantially flat. These surfaces 30 allow for engagement of a coupling segment as will be described further herein. While these surfaces 30 are flat, they may have some friction enhancing aid such as knurling or the like.

The inner edge of each arm 20, 22 forms a generally circular shape to grasp the outside surface of a pipe segment 80 (FIG. 2). Additionally, the inner edge of each arm 20, 22 may be used to engage or grasp coupling and move such coupling on to or along an outer surface of a piping segment 80.

Each of the arcuate segments 26, 28 are separated by at least one spacer 32. The at least one spacer 32 creates a space 34 between the segments 26, 28 further allowing for positioning of a linkage 38, 40. According to the instant embodiment, each linkage 38, 40 has a head 42 disposed between segments 26, 28. The head 42 has a length which is the same as the spacer 32. Alternatively, the spacer 32 may be of a different size where the segments 26, 28 are bent or other structure is used to accommodate for such change in size of the head 42. The linkage 38 extends from the head 40 to a second end 44.

Extending between the upper and lower linkages of each jaw assembly 12, 14 is a jaw actuator 50. The jaw actuators 50 may also be referred to as tangential actuators which move linearly as these move the arms 20, 22 and vary the circumference of the jaw assemblies 12, 14. The jaw actuators 50 move in a generally tangential direction. This movement opens and closes the first and second arms 20, 22 which move about pivot 24 in order to grasp or release a piping segment 80. Additionally, such closing may cause rounding of the pipe segment 80 as described further.

The jaw actuators 50 may be in the form of hydraulic actuators. According to such embodiment, the hydraulic fluid may be pumped by hand or by an automated pump in order to cause extension or retraction of a piston rod. When the actuator 50 extends, the first and second arms 20, 22 move away from one another about the pivot 24. When the actuator 50 retracts, the first and second arms 20, 22 move toward one another to decrease circumference of the jaw assemblies 12, 14. The hydraulic system may have a circuit that includes a manual hand pump or an automated pump 29. Alternatively, an electric actuator may be utilized. An actuator of this type may have a rotating motor which drives the piston rod in two directions to extend or retract. The motor may rotate about the axis of the actuator 50 or may be turned to rotate about an axis which is perpendicular to the actuator 50. As a further alternative, the jaw actuator may comprise a manually operable clamping mechanism which, for example, may be rotated manually to open or close the jaw assemblies 12, 14. In one exemplary embodiment, for example, such embodiment may include a threaded eyebolt, with clamp knob, such as a hex shaped clamp knob, and a thrust bearing to accommodate manual operation. However, various devices may be utilized as the manually operable jaw actuator.

The actuators 50 each may include clevis structures 54, 56 which are connected to the linkages 38, 40. Various fastening arrangements may be utilized. Further, it may be desirable to utilize a connector which allows pivoting motion about at least one axis and further provides easy connect and disconnect functionality. When the actuators 50 are closed, the jaw assemblies 12, 14 are in the circular form to grasp and hold the pipe segment 80 in a round cross-sectional shape.

The first and second jaw assemblies 12, 14 are movable toward or further from one another by way of the linear actuators 16, 18. The actuators 16, 18 are connected to eyelets 60, 62 extending from the first arm 20 and second arm 22. Each of the eyelets 60, 62 includes a neck 64 and a head having an opening (not shown). The neck 64 may be formed of a flat bar stock material wherein the surface of the material lies in a plane extending an axial direction. A hole is cut into the neck 64 material to define a location wherein a clevis of the linear actuators 16, 18 may be positioned and connected by a pin, fastener or the like.

As with the jaw actuators 50, the linear actuators 16, 18 may take various forms. For example, the depicted actuators 16, 18 are hydraulic in nature and have a cylinder 17 and piston 19 to cause extension and retraction. However, alternate types of actuators may be utilized such as air powered or electric actuators. Additionally, further linear actuators are contemplated which may include manual actuators such as ratchet straps, chain and binders, come-alongs, threaded rod and corresponding threaded female receivers or the like. These may be used in a single direction or in two directions. According to the instant embodiment, the actuators 16, 18 are spaced apart about 180°. Other embodiments are contemplated where a single actuator is utilized, or alternatively more than two actuators, to move the first jaw assembly 12 and the second jaw assembly 14 relative to one another in axial directions.

The jig assembly 10 may further comprise a fluid powered circuit. This may be hydraulic or air powered, for example. Further, the fluid powered circuit may be operated by pumps 29 which may be hand pumps or automated pumps to actuate.

Referring now to FIG. 2, an end view of the jig assembly 10 is depicted. The jaw actuator 50 is positioned in an extended orientation so that the first arm 20 and the second arm 22 are spread apart from a normal grasping position. In this position, the jaw assembly 12 can receive a pipe segment 80. The actuator 50 may be disconnected at the piston end to easily position the pipe segment 80 therein or alternatively the actuator 50 may be extended and the jaw assembly 12 positioned over an end of the pipe segment 80.

The pipe segment 80 is depicted as oblong or ob-round shaped. This mis-shaping occurs generally after a pipe segment is manufactured or after some time in service and may be due to the high weight of the relatively larger size piping, or alternatively due to the weight of fill material on the top of the pipe segment 80 or combination. This oblong shaping may increase as pipe diameters increase. The oblong shape is generally horizontal however, the oblong shape may be vertical as depicted in broken line or further may be at other angles. The pipe segment 80 is held in position along the outer surface of the pipe segment 80 at inner edges 23 of arms 20, 22.

The circumferential actuator 50 is extended to increase interior diameter of the jaw assemblies 12, 14 to allow positioning of the pipe segment 80 between the arms 20, 22. As depicted, the arms 20, 22 contact the pipe segment 80 in two locations, one near pivot 24 and a second point at opposite ends of the arms 20, 22. When the first and second arms 20, 22 begin to close due to the retraction of the actuator 50, the contact between radial inner edges 23, 25 and the outer surface of the pipe segment 80 will increase causing the pipe segment 80 to assume the shape of the inner edges 23, 25.

Figure 3:
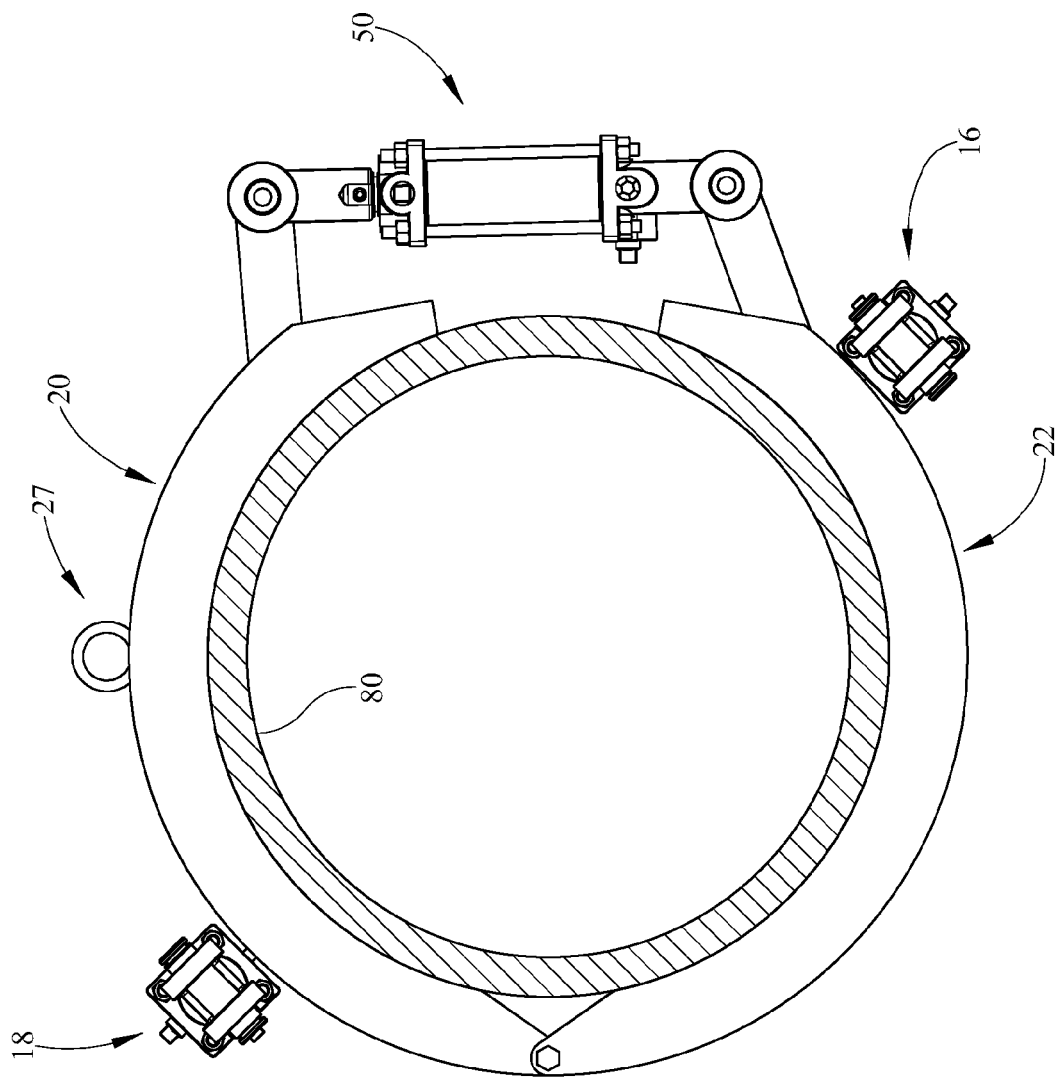
FIG. 3 is an end view of the jaw assembly of FIG. 2 in a closed position with a pipe section in a rounded orientation.

With reference now to FIG. 3, in addition to grasping and retaining the pipe segment 80 in a specific position, the first arm 20 and the second arm 22 function to re-round the pipe segment 80 to a proper circular cross-section for joining to a second pipe segment. As shown, the actuator 50 is retracted closing the arms 20, 22. As the arms 20, 22 close, the inner edges 23, 25 (FIG. 2) of the arms 20, 22 engage the pipe segment 80 outer surface. The pipe segment 80, due to the flexible nature of the material, is forced to change cross-sectional shape from the oblong form of FIG. 2, to the round cross-section shown in FIG. 3. Thus, the jaw assemblies 12, 14 may also be referred to as re-rounders.

Once the pipe segment 80 is re-rounded, the linear actuators 16, 18 may be moved to the pipe segment 80. Alternatively, depending on the orientation of the actuators 16, 18, the pipe segment 80 may remain stationary in axial directions and an adjacent pipe segment 80 may be caused to move. According to the depicted view, the axial direction is movement either into the page or out of the page.

Figure 4:
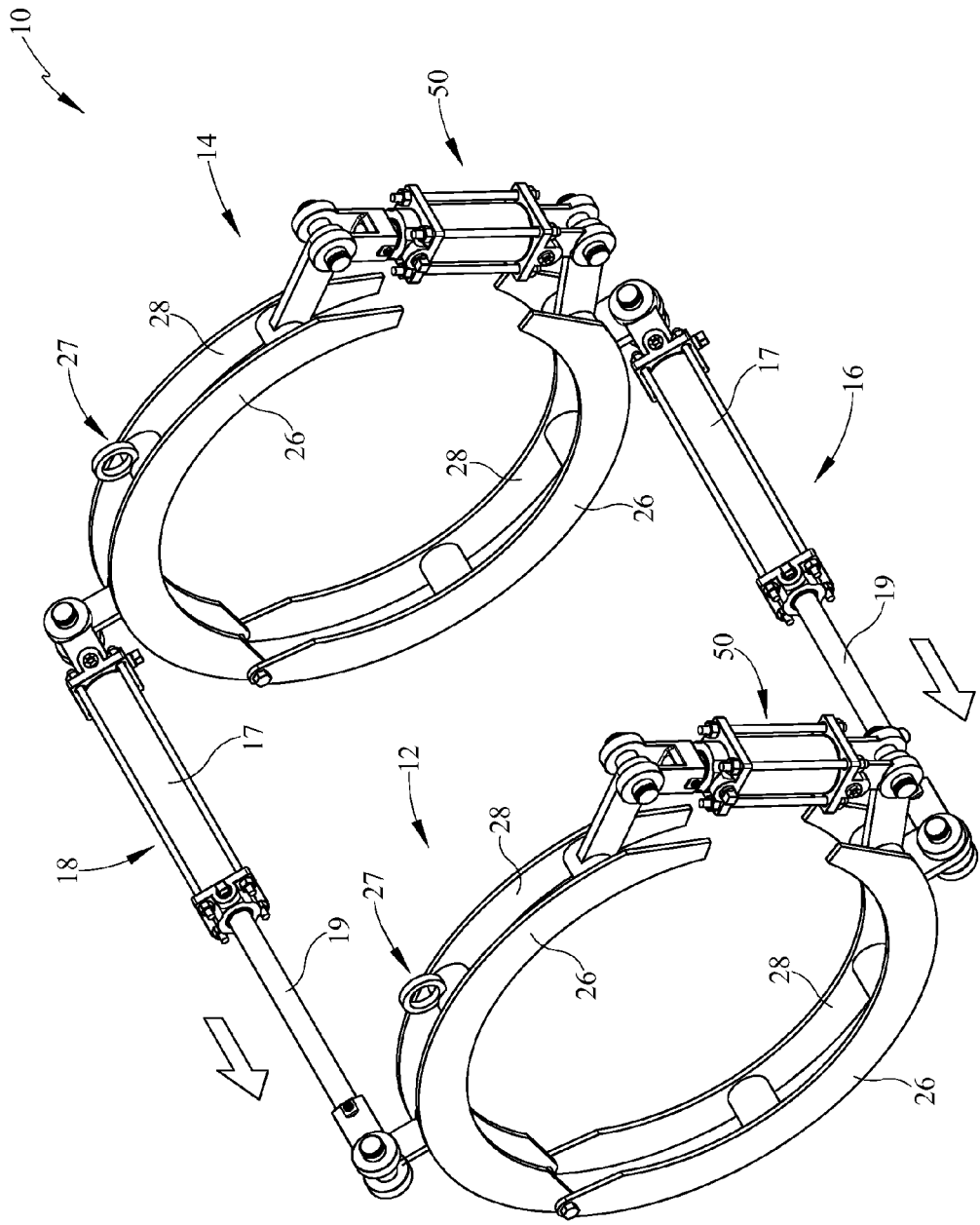
FIG. 4 is an isometric view of the jig assembly in a first extended position.

With reference now to FIG. 4, an isometric view of the jig assembly 10 is shown. The view shows linear actuators 16, 18 oriented so that the cylinder portion 17 of the actuators are engaging the second jaw assembly 14. In this orientation, the second jaw assembly 14 may be fixed relative to a pipe segment (not shown) and the first jaw assembly 12 may move in an axial direction. The first jaw assembly 12 may cause movement of another pipe segment or alternatively, may be used to move a coupling which is positioned on either pipe segment associated with the jaw assemblies 12, 14.

In the depicted view, the linear actuators 16, 18 include the cylinder portions 17 and piston portions 19. The cylinder 17 is mounted at the stationary end of the jig assembly 10 and the piston portion 19 is connected to the moving end of the jig assembly 10. The piston portions 19 depicted are moving away from the cylinder end 17 to an extended position. The actuators 16, 18 are easily connectable and disconnectable to change orientation of the actuators 16, 18 and move either of the jaw assemblies 12, 14 relative to the other.

Additionally, the jaw assemblies 12, 14 are shown having two segments 26, 28 forming each arm 20, 22. While two segments are shown, it is within the scope of the instant embodiments that a single solid segment be utilized. However, the presently depicted embodiment reduces weight as compared to solid arms while still providing the requisite strength and rigidity needed for pipe joining operations. The weight savings allows for easier handling of the jaw assemblies 12, 14 when positioning within a hole, for example following a line breakage and during a repair process. As shown at the top of the jaw assemblies 12, 14, lifting eyelets 27 may be utilized to aid handling and maneuvering of the jaw assemblies 12, 14 either with or without piping segments therein. The lifting eyelets 27 may be used in combination with a crane or other hoisting structure for lifting and moving if necessary.

Figure 5:
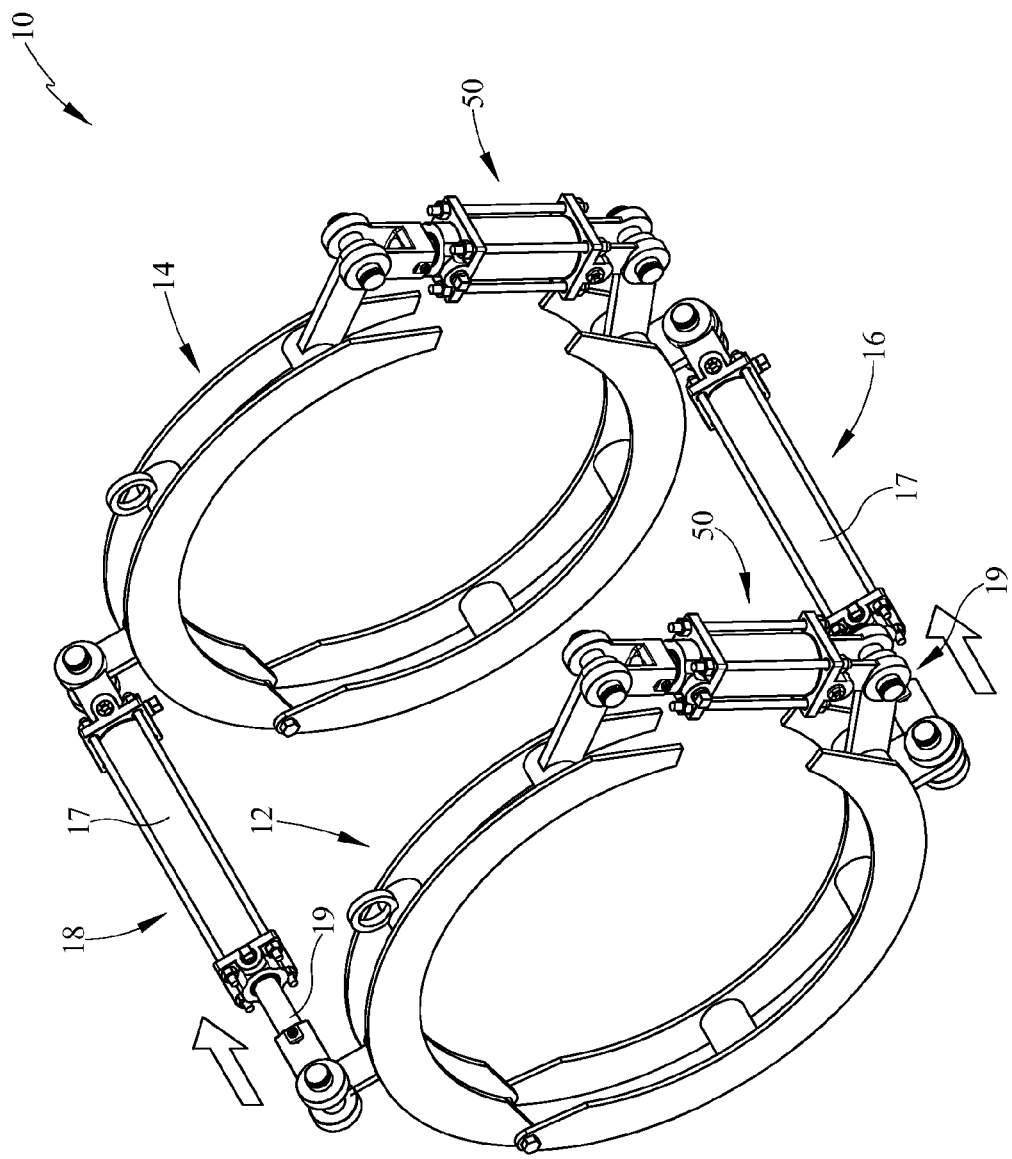
FIG. 5 is an isometric view of the jig assembly in a second retracted position.

Referring now to FIG. 5, an isometric view of the jaw assemblies 12, 14 is again shown. In this embodiment, the actuators 16, 18 are shown retracted. Specifically, the cylinder portions 17 remain oriented toward the second jaw assembly 14 and the piston portions 19 are retracted within the cylinders pulling the first jaw assembly 12 closer to the second jaw assembly 14. The cylinder portion 17 is generally stationary and the piston portion 19 is generally moveable to move or maintain position of associated jaw assemblies 12, 14.

Referring now to FIGS. 6-10, a sequence of views is depicted for moving a first pipe segment 80 relative to a second pipe segment 86 prior to joining the pipe segments. The first jaw assembly 12 is shown connected to a first pipe segment 80. The pipe segment 80 includes a first end 82 which is open. The open end 82 may be present due to a break in a line or the pipe segment 80 may be for new construction where two pipe segments need to be joined. A second pipe segment 86 is spaced from the first pipe segment 80. The second pipe segment 86 includes an open end 88 corresponding to the opening 82 where the two pipe segments 80, 86 are to be joined. The second pipe segment 86 is grasped or retained by the second jaw assembly 14. In the view depicted, the circumferential actuators 50 are on the backside of the pipe segments 80, 86. Accordingly, these are not shown.

Extending from the first jaw assembly 12 are the linear actuators 16, 18. The actuators 16, 18 are arranged such that they extend from the first jaw assembly 12 to a backstop 90 in order to move the backstop. The backstop 90 may take various forms. For example, the structure may be a rectangular cross-section bar or a circular cross-section tube. Alternatively, the backstop 90 may be circular in shape with projections which may engage the pistons 19. Various shapes and structures may be utilized which are equal to or greater than the diameter of the coupling 84. With the backstop 90 sized greater than the diameter of the coupling 84, the backstop 90 will extend across the entirety of the coupling 84 touching the coupling 84 at two locations and allowing the actuators 16, 18 to engage the backstop 90. The instant embodiment of the backstop 90 includes a middle portion 92 which extends between a first end 93 and a second end 94. According to the instant embodiment, the backstop 90 includes first and second holes through which a clevis 75 may be connected. However, alternate embodiments may be utilized.

The actuators 16, 18 have the cylinder portion 17 connected to the first jaw assembly 12. The pistons 19 extend from the cylinder 17 and are connected by the clevis 75 to the backstop 90. The open ends 82, 88 of the pipe segments 80, 86 may be cleaned or trimmed to remove oxidation or scale from the outer surface.

In the instant embodiment, the jaw assembly 12 is clamped to the outer surface of the first pipe segment 80. The assembly 12 allows for positioning of the structure within a hole where the pipe is located or alternatively, for use during construction above ground. The jig assembly 10 is not frame mounted but instead is supported during use by the pipe(s) being coupled. Thus, the jig assembly 10 is not self-supporting. The coupling 84 is disposed at or near an open end 82 of the pipe segment 80 and captured by the backstop 90. The coupling 84 is circular in cross-section having an inner diameter that is sized to appropriately fit over the outer diameter of the first pipe segment 80 and second pipe segment 86.

The cylinders 17 are positioned closest to the first jaw assembly 12 and the pistons 19 are extended. The coupling 84 is positioned against the backstop 90 and ready for retraction of the actuators 16, 18.

Figure 6:
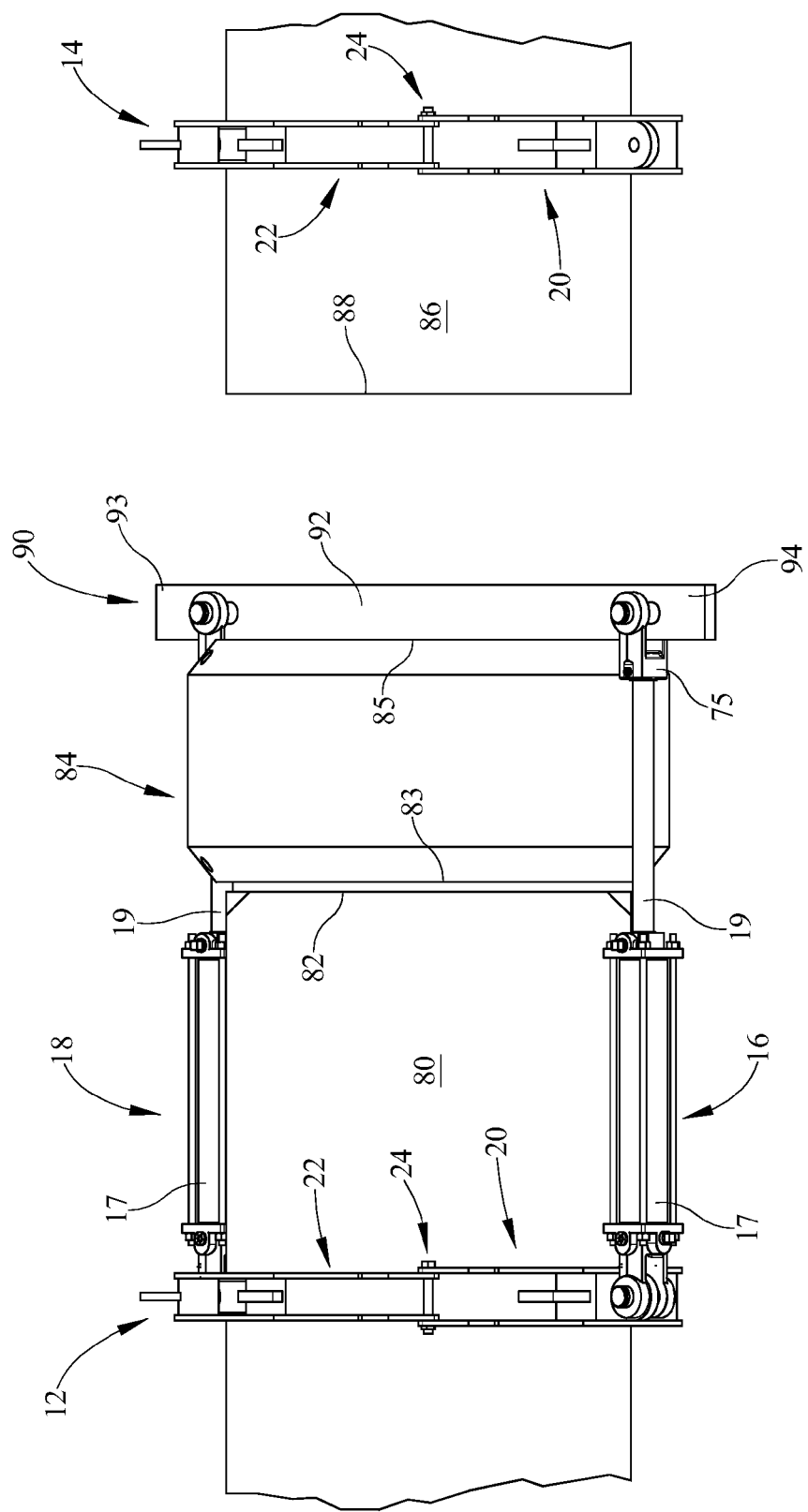
FIG. 6 is a first exemplary step of a method of using the jig assembly.
Figure 7:
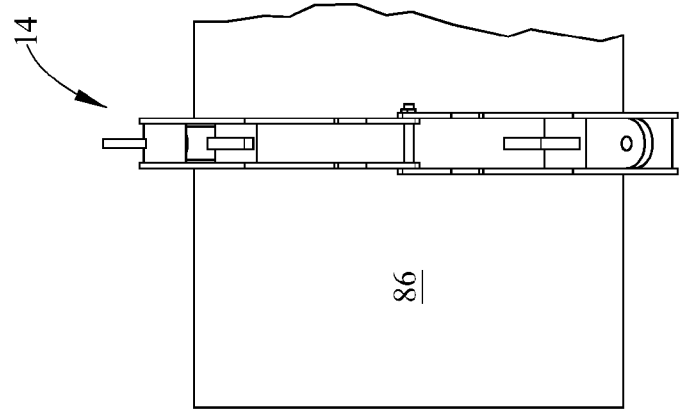
FIG. 7 is a second exemplary step of a method of using the jig assembly.
Figure 7:
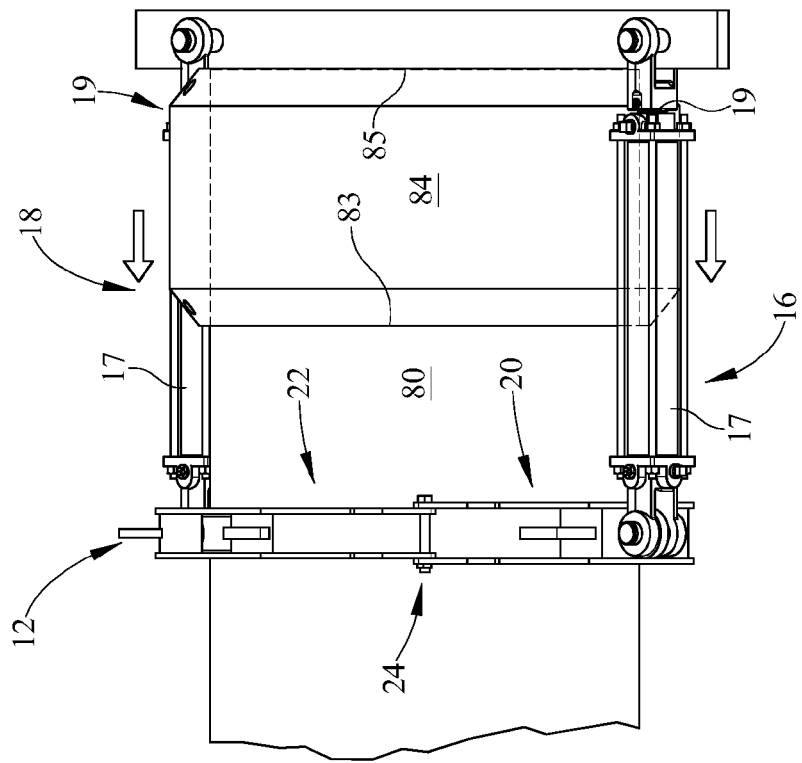

Referring now to FIG. 7, a side view of a step following the sequence of FIG. 6 is depicted. With the first jaw assembly 12 affixed to the first pipe segment 80, and the pistons 19 are retracted in a first move causing the backstop 90 to pull toward the end 82 (FIG. 6) of pipe segment 80. As this first move retraction occurs, the coupling 84 begins to slide over the outer surface of pipe segment 80. The coupling 84 has a first end 83 and a second end 85. The first end 83 is shown sliding over the pipe end 82 (FIG. 6). The coupling 84 is retracted by way of the backstop 90 until the backstop 90 engages the pipe end 82. In this position, the coupling second end 85 is also flush with the pipe end 82. One skilled in the art will understand that the length of coupling 84 in the axial direction should be less than the travel distance of the piston 19 so that the coupling 84 may be fully retracted onto the first pipe segment 80. However, in another embodiment, the first pipe segment 80 may be marked so that the coupling 84 is not pulled completely flush against the end of the segment 80. Instead, the coupling 84 may overhang the first pipe segment 80 a preselected distance so that second pipe segment 86 may be positioned into the coupling. Additionally, depending on orientation of the linear actuators 16, 18, the first move may alternatively be a push movement.

Also shown in FIG. 7, the second jaw assembly 14 is positioned on the second pipe 86. In this step, the second jaw assembly 14 is ready for operation but may not be utilized.

Figure 8:
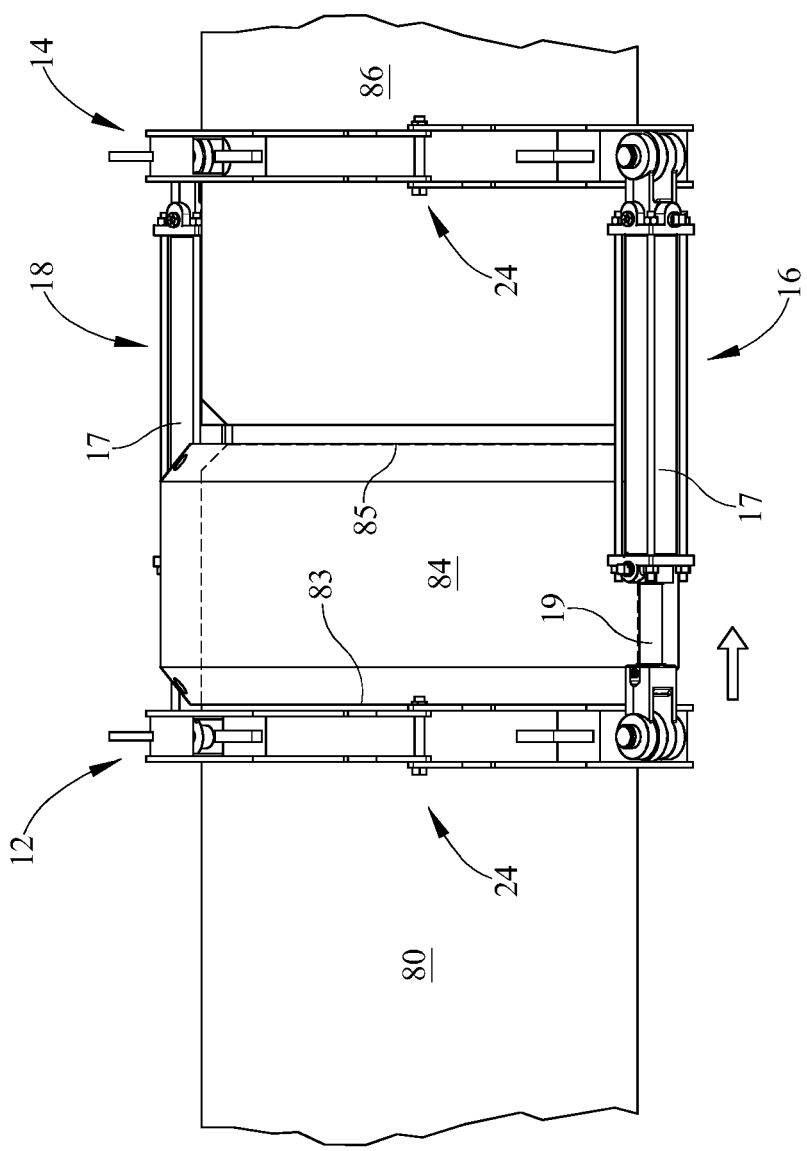
FIG. 8 is a third exemplary step of a method of using the jig assembly.

Referring now to FIG. 8, a third step is shown. In this embodiment, the second jaw assembly 14 is clamped to the pipe segment 86. The linear actuators 16, 18 have been reversed so that the cylinder portions 17 are connected to the second jaw assembly 14. The first jaw assembly 12 is loosened on the first pipe segment 80. The pistons 19 are extended so that the first jaw assembly 12 is engaging the first end 83 of the coupling 84 for moving the coupling 84 over the seam between pipes 80, 86.

When the jaw assembly 12 is loosened, the pistons 19 may be retracted moving toward the right side of the figure. The jaw assembly 12 engages coupling 84 and causes movement of the coupling 84 to the right, in the depicted embodiment. Alternatively, a spacer or other similar structure may be located between the first jaw assembly 12 and the coupling 84. Alternatively, a backstop structure may be connected to the pistons 19 so that retraction of the pistons 19 causes movement of the coupling 84. However, such backstop structure would need to be varied to accommodate for, or surround, the first pipe segment 80 while still engaging the coupling 84. Various shapes could be utilized including, but not limited to, square or circular in order to use a backstop in such an alternative manner.

Figure 9:
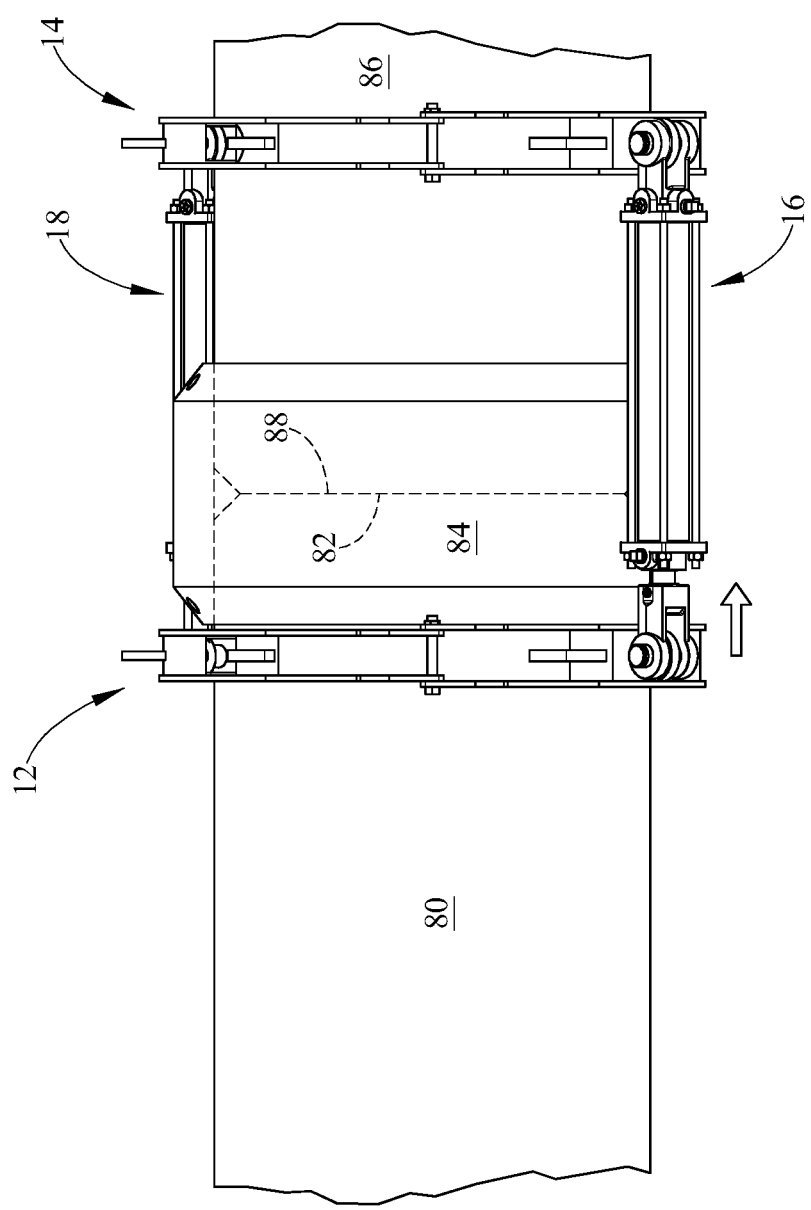
FIG. 9 is a fourth exemplary step of a method of using the jig assembly.

Referring now to FIG. 9, the coupling 84 is moved from its position in FIG. 8 and is generally covering the first end 82 of pipe segment 80 in the first end 88 of pipe segment 86. In this position, the jaw assembly 12 is fully retracted. Alternatively, the backstop 90 is moved to a position causing the coupling 84 to be generally centered at the abutting ends 82, 88 of the pipe segments 80, 86. Accordingly, the coupling 84 is disposed over the seam between segments 80, 86 and the coupling 84 may be welded to the first and second pipe segments 80, 86.

It is also contemplated that the coupling 84 may be positioned over an edge of one pipe segment and the jig assembly 10 may be used to move the second pipe segment into the open end of the coupling.

Figure 10:
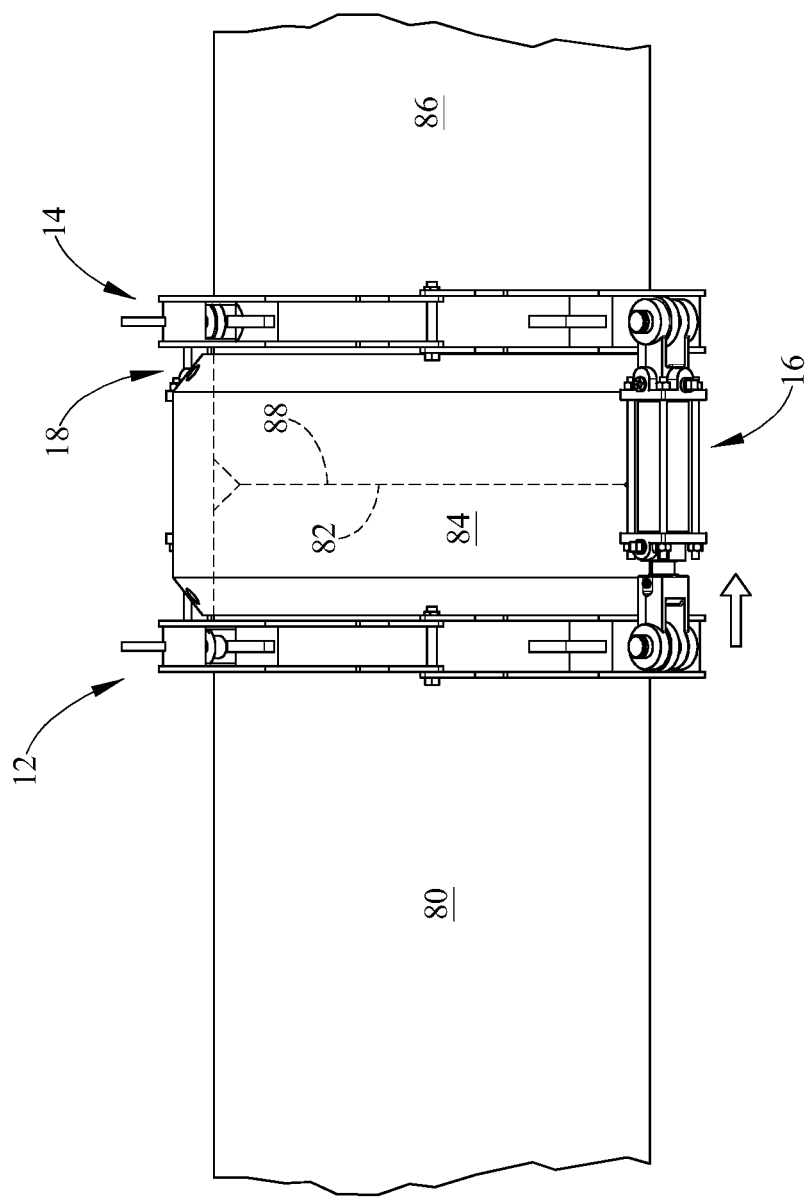
FIG. 10 is an alternative method of the step depicted in FIG. 9

Referring to FIG. 10, a further alternative method step is provided which differs from the step depicted in FIG. 9. In FIG. 10, the coupling 84 is moved from its position in FIG. 8 to its final position, which is generally centered over both of the pipe segments 80, 86. In this embodiment, however, the second jaw assembly 14 is initially positioned at a final resting position for the coupling 84. Then the first jaw assembly 12 is fully retracted so that when the coupling move is complete, the coupling 84 is disposed against both the first jaw assembly 12 and the second jaw assembly 14. Thus, by comparison with FIG. 9 where the second jaw assembly 14 may be spaced away from the coupling 84 when the coupling is in its final position, the embodiment of FIG. 10 provides that the second jaw assembly 14 may be positioned against the coupling 84 when the coupling 84 is in its final or home position. In the first embodiment of FIG. 9, it may be desirable to mark a stopping point on the pipe segment 86 prior to moving the coupling 84. Alternatively, in the embodiment of FIG. 10, rather than marking the pipe segment 86, the second jaw assembly 14 need only be placed at the stopping position so that the coupling 84 abuts the second jaw assembly 14 in the final position. It should be understood that the length of the actuators 16, 18 may need to accommodate a design and method where jaw assemblies 12, 14 are abutting the coupling 84 in the finished or home position. For example, the actuators 16, 18 in FIG. 10 are shorter than in FIG. 9.

Figure 11:
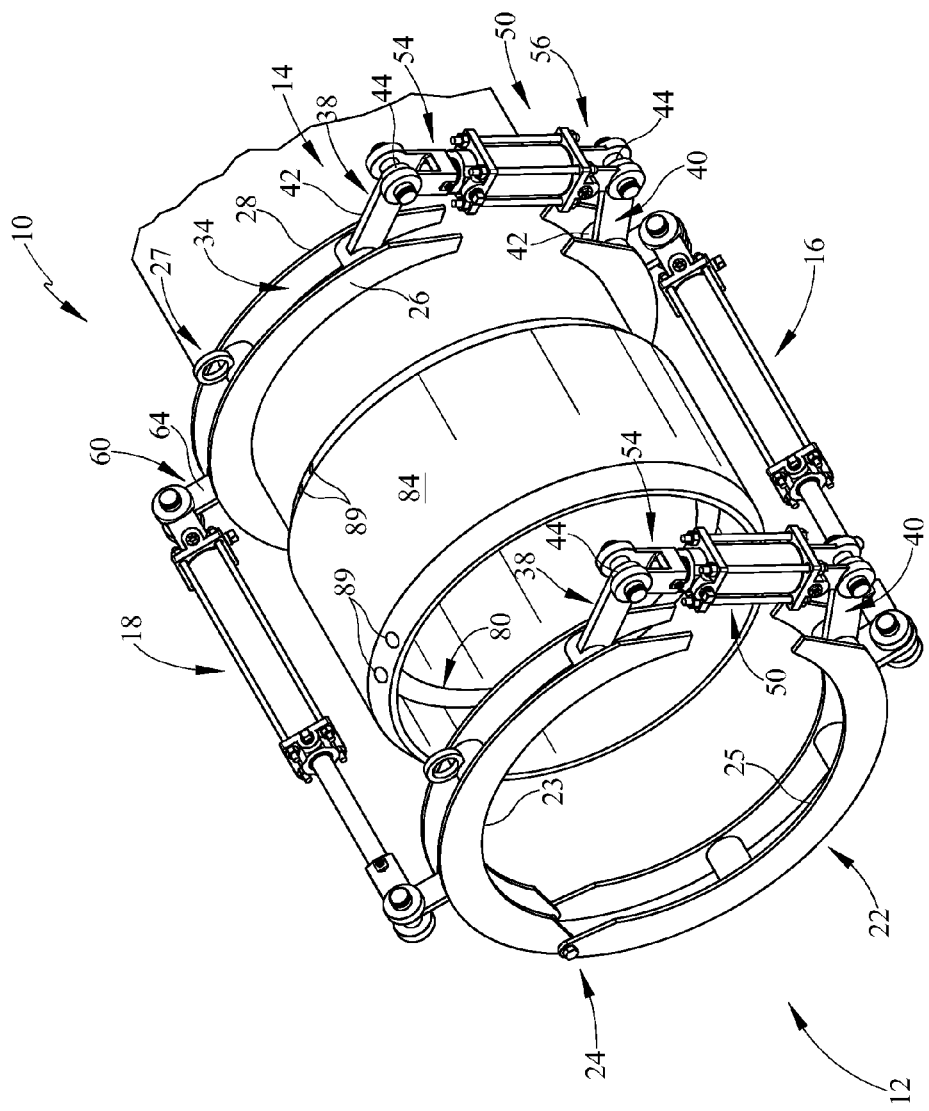
FIG. 11 is an isometric view of a portion of the jig assembly including a coupling positioned on one of the pipe sections; and, FIGS. 12-14 depict an alternative method sequence for joining pipe segments.

Referring now to FIG. 11, an isometric view of the jig assembly 10 is shown. The coupling 84 is positioned over one of the exemplary pipe segments 80, 86. The coupling 84 includes at least two leads 89 disposed near axial ends of the coupling. The exemplary embodiment includes four leads, for example. The leads 89 are connected to wires which wrap about the coupling 84 within the coupling material and, when connected to a voltage source of desired current, will weld the pipe segments 80, 86 and the coupling 84 together.

Figure 12:
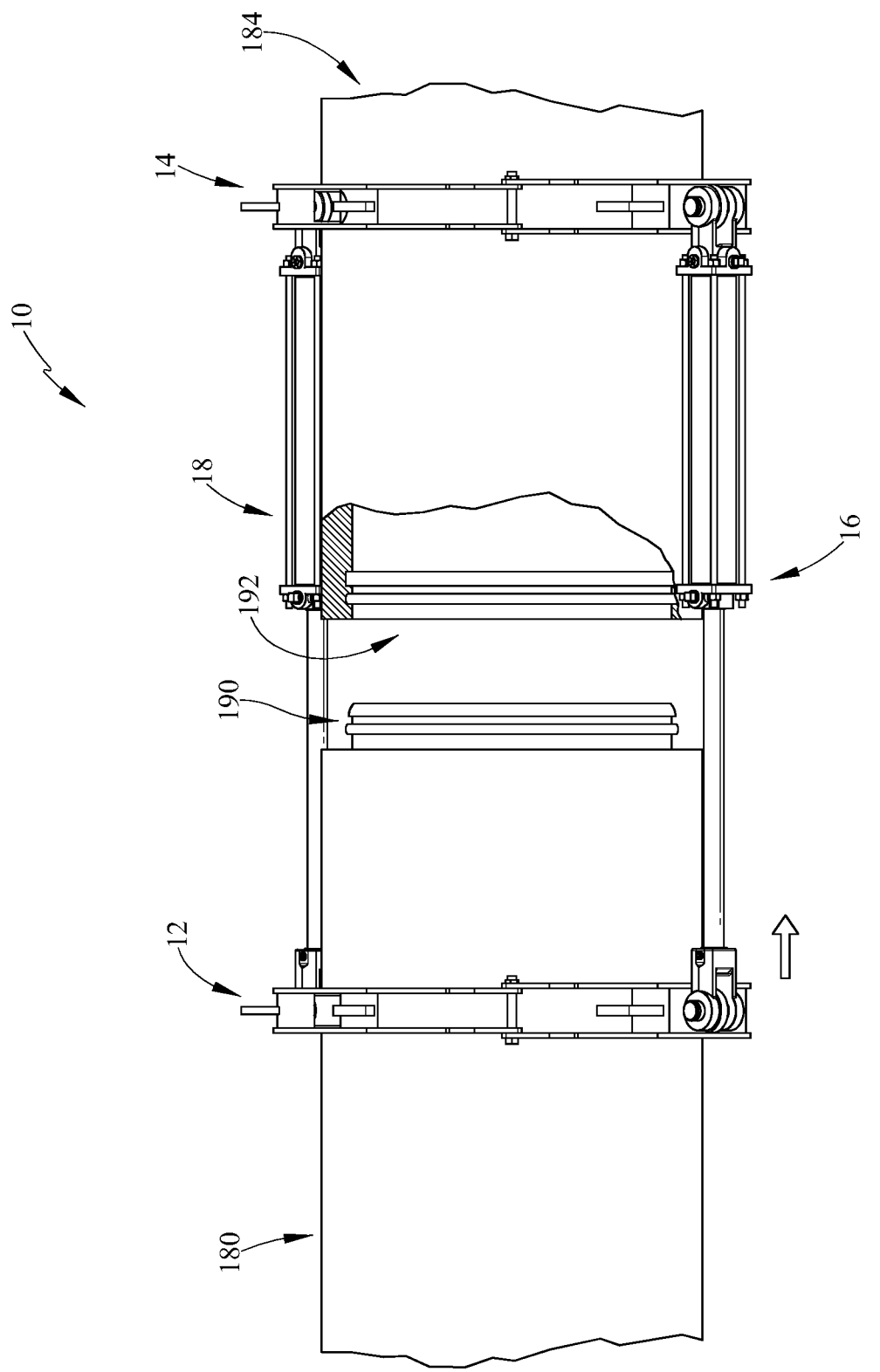

Referring now to FIG. 12 an alternate method of using the jig assembly 10 is depicted. In the alternate method, the jaw assembly 12 is located on a first pipe segment 180 and the jaw assembly 14 is located on a second pipe segment 184. According to the instant embodiment, the coupling structure is not utilized. Instead, the pipe segments 180, 184 are joined by integrally formed connecting structures 190, 192. For example in one embodiment, the pipe segments 180, 184 may have a male engagement structure 190 and a female engagement structure 192 which engage one another when the segments are pulled together. The male and female structures 190, 192 provide a locking engagement but may alternatively be a non-permanent locking engagement. Additionally, the structures 190, 192 may include a sealing feature or may have a separate, independent sealing feature. The jig assembly 10 is shown further comprising at least one of linear actuator 16, 18 in the embodiment depicted. The actuators 16, 18 extend between the jaw assemblies 12, 14 and allow for movement of the jaw assemblies 12, 14 in the axial direction of the pipe segments 180, 184. By connection of the jaw assemblies 12, 14 to segments 180, 184 respectively, the pipe segments 180, 184 may also be moved by the jig assembly 10.

Figure 13:
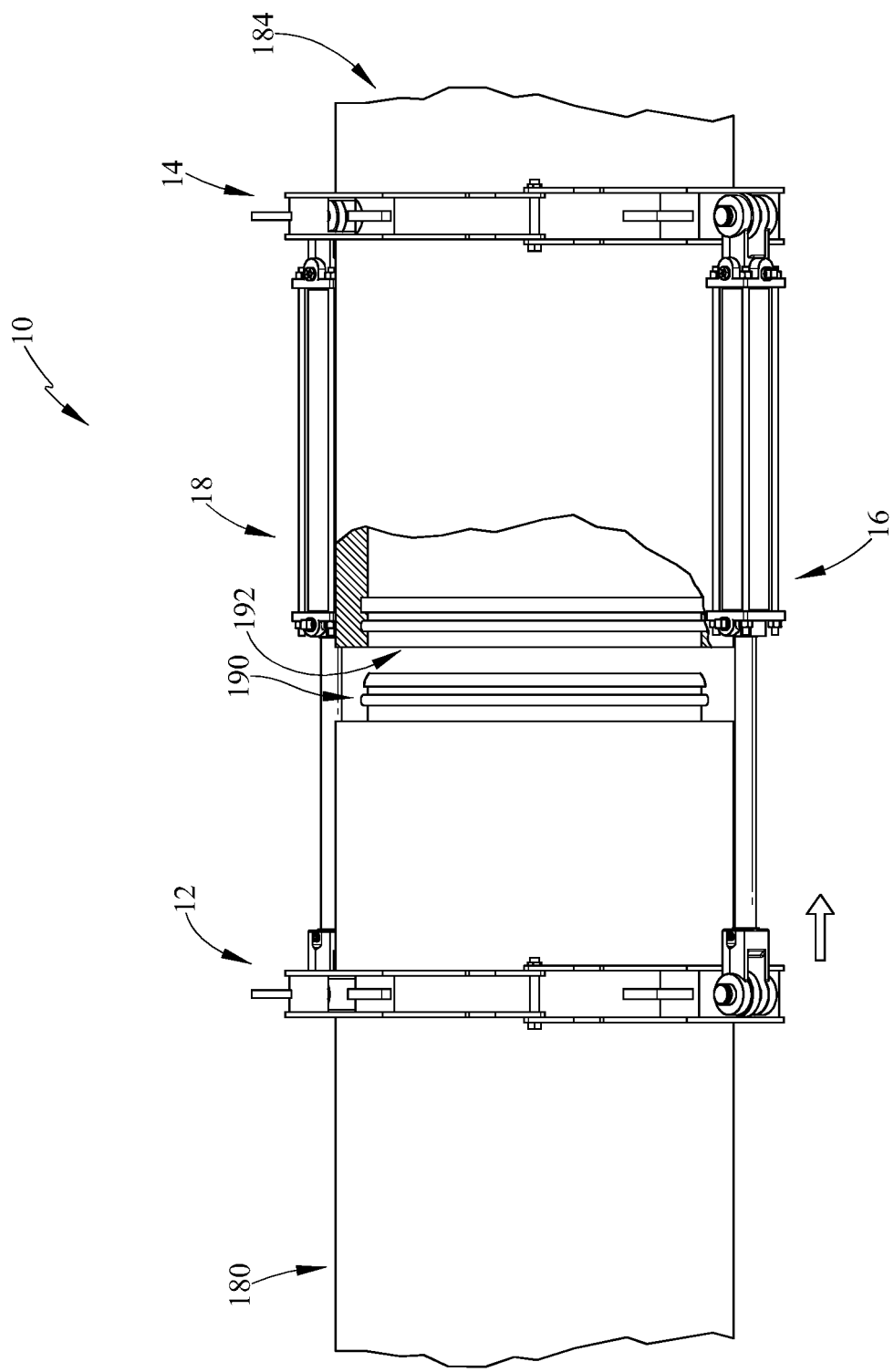

With reference now to FIG. 13, the segments 180, 184 are shown pulled closer together by the jig assembly 10. In this figure, the actuators 16, 18 are contracted thereby pulling the jaw assemblies 12, 14 closer together. As a result, the male and female connectors 190, 192 are closer to engagement by comparison to FIG. 12.

Figure 14:
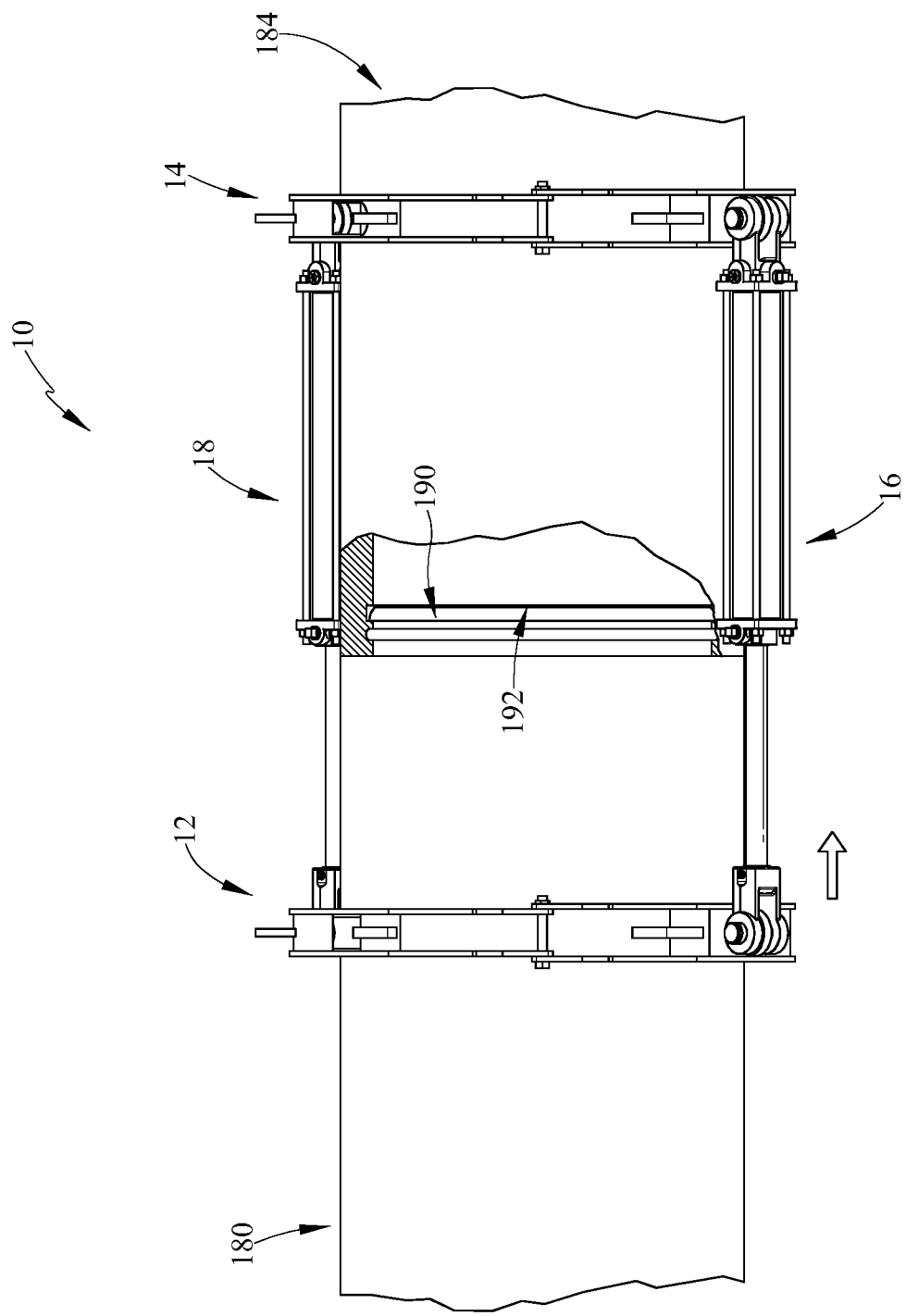

With reference now to FIG. 14, the pipe segments 180, 184 are positioned together and the connectors 190, 192 are shown (internally) due to the engagement. The linear actuators 16, 18 have fully connected the engagement structures 190, 192 and the pipe segments 180, 184 are abutting one another. With this type of pipe segment, the structure is fully connected and sealed. Additionally, other embodiments of piping may be utilized such as butt-welded pipe wherein the jig assembly may be utilized to pull the segments together for the butt-welding process.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A method of coupling pipes, comprising:
   connecting a first re-rounder to a first pipe;
   connecting at least one linear actuator to said first re-rounder, said at least one actuator being movable in a first direction which is transverse to said first re-rounder;
   connecting a second end of said at least one linear actuator to a backstop, said backstop being movable with said at least one linear actuator;
   performing a first moving step comprising moving a coupling on to said first pipe with said backstop and said at least one linear actuator;
   connecting a second re-rounder to a second pipe;
   loosening said first re-rounder;
   performing a second moving step comprising moving of said linear actuator to move said first re-rounder to engage said coupling and further move said coupling into engagement with said first and second pipes; and, fusion welding said coupling to said first and second pipes.

2. The method of claim 1, said first moving step being a pull.

3. The method of claim 1, said first moving step being a push.

4. The method of claim 1, said second moving step being moving of said first pipe and said coupling.

5. The method of claim 1, said second moving step being moving of said first pipe.

6. The method of claim 1, said second moving step being moving of said coupling.

7. The method of claim 1, further comprising connecting electrodes to said coupling for said fusion welding.

8. The method of claim 1 further comprising reversing orientation of said at least one linear actuator to connect to said second re-rounder before said second moving step.

9. The method of claim 1 further comprising stopping said coupling against said second re-rounder.

10. The method of claim 1 further comprising engaging said coupling with both of said re-rounders.

11. A method of joining piping, comprising:
applying a first jaw assembly to a first pipe segment;
applying a second jaw assembly to a second pipe segment;
connecting a first end of a linear actuator to one of said first jaw assembly and said second jaw assembly;
connecting a second end of said linear actuator to the other of said first jaw assembly and said second jaw assembly;
actuating said linear actuator to move one of said pipe segments and a coupling;
loosening one of said first or second jaw assemblies;
positioning the coupling over adjacent ends of said first and second pipe segments by movement of said loosened one of said first and second jaw assemblies.

12. The method of claim 11, said positioning including movement of said coupling.

13. The method of claim 12, said positioning including moving one of said pipe segments into said coupling.

14. The method of claim 11, said positioning including movement of at least one of said first and second pipe segments.

15. The method of claim 11 further comprising reversing orientation of said linear actuator before said positioning of the coupling by movement of said first jaw assembly.

* * * * *